Patented Apr. 26, 1938

2,115,446

UNITED STATES PATENT OFFICE

2,115,446

VAT DYESTUFFS OF THE ANTHRAQUINONE-AZINE SERIES

Karl Koeberle and Joachim Mueller, Ludwigshafen-on-the-Rhine, Germany, assignors to General Aniline Works, Inc., New York, N. Y., a corporation of Delaware No Drawing. Application November 9, 1934, Serial No. 752,374. In Germany January 20, 1934

13 Claims. (Cl. 260—31)

The present invention relates to new vat dyestuffs and a process of producing same.

We have found that valuable vat dyestuffs yielding blue vats are obtained by treating N-alkyl-anthraquinone-azines with dehydrogenating agents. As N-alkyl-anthraquinone-azines suitable as initial materials for the purpose of the present invention may be mentioned the N-alkyl-anthraquinone-1-2,2',1'-azines obtainable by condensing 1.2- or 2.1-alkylamino-halogenanthraquinones with themselves, if desired in the form of their leuco compounds, or those obtainable by condensing one molecular proportion of 1-alkylamino-2-halogenanthraquinones with one molecular proportion of 1-amino-2-halogenanthraquinone or one molecular proportion of 1-halogen-2-alkylaminoanthraquinone with one molecular proportion of 1-halogen-2-aminoanthraquinone.

As dehydrogenating agents suitable for the purpose of the present invention may be mentioned halogens, agents supplying halogen, as for example sulfuryl chloride, phosphorus pentachloride, benzoyl chloride and the addition compound of bromine and pyridine, furthermore pyrolusite in the presence of a mineral acid, lead dioxide, lead tetraacetate, mixtures of concentrated sulfuric and nitric acids and mixtures of alkali metal bromides with chlorsulfonic acid or oleum.

The reaction is, generally speaking, carried out at elevated temperature, especially if halogens or agents supplying halogen are employed. In the latter case, it is of special advantage to carry out the reaction in an organic diluent as for example nitrobenzene or trichlorbenzene.

If halogens or agents supplying halogen are employed, a halogenation of the reaction products may occur at the same time. The reaction products obtained by the treatment with other dehydrogenating agents may be halogenated in a separate operation. Besides, halogen-containing reaction products are obtained by employing halogenated N-alkyl-anthraquinone-1,2,2',1'-azines as initial substances.

The reaction products are vat dyestuffs of excellent fastness properties. They yield in all cases blue vats, whereas the initial substances yield brown vats. Besides, the new dyestuffs have a greater strength in color, yield clearer shades of better fastness to chlorine, to light, to the influence of the atmosphere and kier-boiling and are less soluble in organic solvents than the initial substances. They may advantageously be employed for dyeing vegetable fibres from hot vats. The outputs are generally very good, and the dyestuffs are obtained in a state of high purity. They may be purified, if desired, by way of their salts with strong mineral acids or by removing any impurities by heating them with organic solvents.

The following examples will further illustrate how the said invention may be carried out in practice, but these examples are no limitation of the invention. The parts are by weight.

Example 1

23 parts of the N-alkyl-anthraquinone-1,2,2',1'-azine from 1-methylamino-2-bromanthraquinone and 1-amino-2-bromanthraquinone are heated to from 100° to 110° C. for several hours in 230 parts of nitrobenzene, while stirring, after the addition of 2 parts of iodine and 10 parts of bromine. As soon as a sample withdrawn yields a pure blue vat, the whole is allowed to cool and the reaction product which separates in the form of reddish blue needles is filtered off by suction. It yields a blue vat from which powerful clear blue dyeings of excellent fastness properties are obtained.

If 23 parts of bromine be employed instead of 10 parts, a dibromo derivative is obtained under the same conditions. This yields somewhat more greenish blue dyeings than the bromination product obtained according to the foregoing paragraph.

Reaction products containing chlorine and bromine and which likewise yield blue vats and blue dyeings are obtained by employing sulfuryl chloride in addition to bromine. The reaction products containing chlorine and bromine dissolve in concentrated sulfuric acid usually to give a brown coloration.

By starting from the N-alkyl-anthraquinone-1,2,2',1'-azine from 1-brom-2-amino-3-fluoranthraquinone and 1.3-dibrom-2-methylaminoanthraquinone, it is possible to prepare dyestuffs containing fluorine or fluorine and other halogens by treatment with halogen at above 100° C. in the presence of nitrobenzene.

Example 2

23 parts of the initial material employed in Example 1 are dissolved in 230 parts of chlorsulfonic acid after the addition of 2 parts of iodine and 10 parts of bromine, warmed to from 60° to 65° C. and kept at the said temperature until a sample withdrawn yields a blue vat. The whole is allowed to cool, the reaction mixture is poured into water, filtered by suction and the filter cake washed until neutral. The resulting dyestuff which contains 2 atoms of bromine per molecule yields blue dyeings of very good fastness properties on vegetable fibres from a blue vat.

Example 3

23 parts of the very finely divided compound employed as initial material in Example 1 in 230 parts of nitrobenzene are heated for 3 hours while stirring at 75° C. after the addition of 2 parts of iodine and 35 parts of sulfuryl chloride, and then for another 2 hours at 100° C. When the reaction is completed the whole is allowed to cool and the reaction product is isolated by filtration by suction or by distilling off the solvent, if desired with steam. A blue crystalline powder containing 2 atoms of chlorine per molecule is obtained which dissolves in concentrated sulfuric acid giving an orange coloration; it yields a blue-green vat from which vegetable fibres are dyed powerful greenish blue shades of excellent fastness to kier boiling that is the usual soda boiling stability test and chlorine.

A reaction product containing one to two chlorine atoms having similar properties is obtained by carrying out the reaction with chlorine in trichlorbenzene.

If the reaction described in the first paragraph of this example be carried out at 40° C. while lengthening the duration of the reaction to from 6 to 10 hours, a N-methyl-N-dihydroanthraquinoneazine containing 3 to 4 chlorine atoms is obtained which yields somewhat more reddish dyeings than the product obtainable according to the first paragraph of this example and which is entirely fast to chlorine.

Example 4

45.6 parts of the initial material employed in Example 3 are heated for 6 hours at about 100° C. in 460 parts of nitrobenzene after the addition of 2 parts of iodine and 60 parts of bromine. The reaction product obtained in beautiful needles is a dibromo derivative according to analysis and yields on vegetable fibres from a blue vat at 60° C. clear, greenish blue dyeings of excellent fastness properties which are essentially superior, especially as regards fastness to chlorine, to the dyeings obtained with the initial material free from halogen.

A reaction product having similar properties is obtained when carrying out the treatment with bromine in other organic diluents, such as trichlorbenzene.

A mono-bromo derivative is obtained when employing in the process described in the first paragraph of this example 16 parts of bromine. It yields somewhat more reddish blue dyeings than the dibromo derivative of improved fastness to chlorine as compared with the initial material.

The treatment with bromine may also be carried out in chlorsulfonic acid. On grinding the finely divided initial material in a ball mill with bromine in the presence of iodine a bromo derivative is likewise obtained.

Example 5

23 parts of the initial material employed in Example 1 are heated to boiling for about 5 hours in 200 parts of nitrobenzene after the addition of 50 parts of benzoyl chloride and 2 parts of iodine. After cooling, the reaction product, which is substantially chlorine free, separated in lustrous bronze crystalline needles is filtered off. It dissolves in concentrated sulfuric acid to give a brown solution and yields a pure blue vat from which at between 40° and 60° C. the vegetable fibre is dyed strong, clear blue shades of very good fastness properties.

Example 6

10 parts of the N-alkyl-anthraquinone-1,2,2',1'-azine obtainable by treating 1.3-dibrom-2-methylaminoanthraquinone with sodium acetate in nitrobenzene in the presence of a little copper acetate which contains bromine and yields a brown vat, are dissolved in 100 parts of nitrobenzene. After the addition of one part of iodine and 15 parts of sulfuryl chloride, the mixture is heated for 3 hours at about 75° C. and then for further 2 hours at about 95° C. After cooling, the reaction product containing 3 atoms of chlorine and 2 atoms of bromine is filtered off by suction and freed from nitrobenzene for example by washing with ethanol. It is a green blue powder which from a blue vat dyes vegetable fibres powerful blue shades of excellent fastness.

A vat dyestuff containing 2 atoms of chlorine and 2 atoms of bromine having similar properties is obtained if the compound obtainable by treating 1.3-dibrom-2-ethylaminoanthraquinone with sodium acetate in nitrobenzene in the presence of a little copper acetate which yields a brown vat, is chlorinated in the manner described above.

Example 7

10 parts of the compound employed as initial material in Example 6 are dissolved in 100 parts of nitrobenzene. After the addition of 1 part of iodine and 15 parts of bromine, the mixture is heated for 3 hours at about 75° C. and for further 2 hours at about 95° C. After cooling, the reaction product containing 2 bromine atoms is filtered off by suction and freed from nitrobenzene for example by washing with ethanol. It is a green blue powder which from a blue vat dyes vegetable fibres powerful blue shades of excellent fastness.

A vat dyestuff having similar properties containing 2 atoms of bromine is obtained if the N-alkyl-anthraquinone-1,2,2',1'-azine obtainable by treating 1.3-dibrom-2-ethylaminoanthraquinone with sodium acetate in nitrobenzene in the presence of a little copper acetate which yields a brown vat, is treated with bromine in the manner described above.

Example 8

10 parts of pyrolusite are introduced into a solution of 23 parts of the condensation product employed as initial material in Example 1 in 300 parts of sulfuric acid. The reaction mixture is heated at 80° C. until a sample withdrawn yields a blue vat. After cooling, the whole is filtered off by suction, the filtrate poured into water, the dyestuff precipitated filtered off by suction and washed with water. It is a green-blue powder which yields a blue vat and which dyes cotton clear powerful blue shades of very good fastness properties.

Example 9

5 parts of the condensation product employed as initial material in Example 1 are boiled with a mixture of 50 parts of nitrobenzene and 10 parts of benzoyl chloride for 5 hours. After working up blue-violet needles substantially chlorine free are obtained which dissolve in concentrated sulfuric acid giving a brown coloration and which dye cotton from a blue vat clear blue shades of very good fastness properties.

Example 10

10 parts of the N-alkyl-anthraquinone-1,2,2',1'-azine obtained by treating 1-methylamino-2-bromanthraquinone with sodium acetate in the presence of nitrobenzene and a little copper oxide are boiled with 100 parts of nitrobenzene after the addition of 1 part of iodine for 5 hours. The dyestuff thus obtained which after working up the reaction mixture forms blue crystals, dyes from a blue vat vegetable fibres blue shades of excellent fastness.

Example 11

20 parts of the compound obtainable according to Example 5 are suspended in 100 parts of nitrobenzene. After the addition of 10 parts of bromine and 2 parts of iodine, the mixture is heated for several hours at 120° to 125° C. After cooling, the reaction product which contains 2 atoms of bromine per molecule separates in crystalline form and is filtered off by suction. It dissolves in concentrated sulfuric acid giving a pitch brown coloration. It dyes vegetable fibres from a blue vat greenish blue shades of very good fastness.

Example 12

A mixture of 50 parts of the compound obtainable according to Example 5, 500 parts of nitrobenzene, 75 parts of sulfuryl chloride and 2 parts of iodine is heated for several hours at 75° to 85° C. After cooling, the reaction product which contains 3 atoms of chlorine is isolated in the usual manner. It dissolves in concentrated sulfuric acid giving a yellow brown coloration. It dyes vegetable fibres from a blue vat clear powerful blue shades of excellent fastness.

Example 13

12 parts of the reaction product obtainable according to Example 5 are suspended in 200 parts of nitrobenzene. After the addition of 10 parts of sulfuryl chloride and 1 part of iodine, the reaction mixture is heated, while stirring, at 70° to 75° C. for 3 hours. Then, after the addition of 15 parts of bromine, the temperature is raised to 120° to 125° C. and the whole kept at this temperature for another 3 hours. After cooling, the dyestuff separated is filtered off by suction. It contains 4 atoms of chlorine and 1 atom of bromine and dissolves in concentrated sulfuric acid giving a brown coloration. It dyes vegetable fibres from a blue vat blue shades of excellent fastness.

What we claim is:

1. A process of producing vat dyestuffs of the anthraquinone-azine series which comprises treating N-alkyl-anthraquinone-1,2,2',1'-azines with halogenating agents.

2. A process of producing vat dyestuffs of the anthraquinone-azine series which comprises heating N-alkylanthraquinone-1,2,2',1'-azines with halogenating agents in an organic diluent.

3. A process of producing vat dyestuffs of the anthraquinone-azine series which comprises heating N-alkylanthraquinone-1,2,2',1'-azines with bromine in an organic diluent.

4. A process of producing vat dyestuffs of the anthraquinone-azine series which comprises heating N-alkylanthraquinone-1,2,2',1'-azines with bromine in an organic diluent in the presence of a halogen transferrer.

5. A process of producing vat dyestuffs of the anthraquinone-azine series which comprises heating N-alkylanthraquinone-1,2,2',1'-azines with a chlorinating agent.

6. A process of producing vat dyestuffs of the anthraquinone-azine series which comprises heating N-alkylanthraquinone-1,2,2',1'-azines with sulfuryl chloride.

7. A process of producing vat dyestuffs of the anthraquinone-azine series which comprises heating N-alkylanthraquinone-1,2,2',1'-azines with benzoyl chloride.

8. Vat dyestuffs of the anthraquinone-azine series yielding blue vats containing up to two alkyl groups of low molecular weight attached to the nitrogen atoms of the azine ring obtainable according to the process claimed in claim 1 existing in the crystalline state in the form of blue needles, dissolving in concentrated sulphuric acid with a brown coloration and dyeing cotton clear blue shades of very good fastness to chlorine.

9. Vat dyestuffs of the anthraquinone-azine series yielding blue vats containing up to two alkyl groups of low molecular weight attached to the nitrogen atoms of the azine ring and containing halogen obtainable according to a process covered by claim 1 existing in the crystalline state in the form of blue needles, dissolving in concentrated sulphuric acid with a brown coloration and dyeing cotton clear blue shades of very good fastness to chlorine.

10. Vat dyestuffs of the anthraquinone-1,2,2',1'-azine series yielding blue vats containing up to two alkyl groups of low molecular weight attached to the nitrogen atoms of the azine ring and containing halogen atoms of different kind obtainable according to a process covered by claim 1 existing in the crystalline state in the form of blue needles dissolving in concentrated sulphuric acid with a brown coloration and dyeing cotton clear blue shades of very good fastness to chlorine.

11. Vat dyestuffs of the anthraquinone-1,2,2',1'-azine series yielding blue vats containing up to two alkyl groups of low molecular weight attached to the nitrogen atoms of the azine ring and containing chlorine obtainable according to a process covered by claim 5 existing in the crystalline state in the form of blue needles dissolving in concentrated sulphuric acid with a brown coloration and dyeing cotton clear blue shades of very good fastness to chlorine.

12. Vat dyestuffs of the anthraquinone-1,2,2',1'-azine series yielding blue vats containing up to two alkyl groups of low molecular weight attached to the nitrogen atoms of the azine ring and containing bromine obtainable according to the process of claim 3 existing in the crystalline state in the form of blue needles dissolving in concentrated sulphuric acid with a brown coloration and dyeing cotton clear blue shades of very good fastness to chlorine.

13. Trichlor-N-methyl-anthraquinone-1,2,2',1'-azines obtainable by heating N-methylanthraquinone-1,2,2',1'-azines with sulphuryl chloride in the presence of nitrobenzene and a little iodine acting as catalyst.

KARL KOEBERLE.
JOACHIM MUELLER.